(12) United States Patent
Seok et al.

(10) Patent No.: US 7,459,659 B2
(45) Date of Patent: Dec. 2, 2008

(54) INDUCTION HEATING CIRCUIT AND WINDING METHOD FOR HEATING COILS

(75) Inventors: Kyoung Wook Seok, Seoul (KR); Kang Rim Choi, Cupertino, CA (US)

(73) Assignee: IXYS Corporation, Santa Clara, CA (US)

( * ) Notice: Subject to any disclaimer, the term of this patent is extended or adjusted under 35 U.S.C. 154(b) by 0 days.

(21) Appl. No.: 11/738,381

(22) Filed: Apr. 20, 2007

(65) Prior Publication Data

US 2007/0246458 A1    Oct. 25, 2007

Related U.S. Application Data

(60) Provisional application No. 60/745,335, filed on Apr. 21, 2006.

(51) Int. Cl.
H05B 6/10    (2006.01)
H05B 6/44    (2006.01)

(52) U.S. Cl. .................. 219/624; 219/626; 219/662; 219/661; 363/21.01

(58) Field of Classification Search ......... 219/620–627, 219/661–668; 363/21.01, 97
See application file for complete search history.

(56) References Cited

U.S. PATENT DOCUMENTS 3,781,503 A * 12/1973 Harnden et al. ............. 219/622
3,814,888 A * 6/1974 Bowers et al. ............... 219/624
4,112,287 A * 9/1978 Oates et al. ................. 219/626
5,571,438 A * 11/1996 Izaki et al. .................. 219/625

FOREIGN PATENT DOCUMENTS

JP    5-226069    9/1993
JP    6-29082     5/1994

* cited by examiner

Primary Examiner—Philip H Leung
(74) Attorney, Agent, or Firm—Townsend and Townsend and Crew LLP

(57) ABSTRACT

A heating circuit for heating a conductive bowl includes a voltage source; a first heating coil provided between first and second nodes and being configured to heat the conductive bowl; a second heating coil provided between the second node and a third node and being configured to heat the conductive bowl; first capacitor and first switch provided in parallel between the first node and a fourth node; and second capacitor and second switch provided in parallel between the third node and the fourth node. The first and second heating coils define a circle-like shape having a center. The first and second heating coils are configured to be aligned to each other if one of the first and second heating coils is moved with respect to a line extending through the center of the circle-like shape.

10 Claims, 5 Drawing Sheets

INDUCTION HEATING CIRCUIT AND WINDING METHOD FOR HEATING COILS

CROSS-REFERENCES TO RELATED APPLICATIONS

The present invention claims benefits of U.S. Provisional Application No. 60/745,335, filed on Apr. 21, 2006, which is incorporated by reference.

BACKGROUND OF THE INVENTION

The present invention relates to an induction heating circuit for cooker, e.g., a rice cooker. The rice cooker has a housing enclosing a metal bowl, a heating coil, and a ceramic provided between the heating coil and the metal bowl.

There are several of circuit used to apply high frequency AC voltage on the heating coil. Half bridge converter type circuit and push-pull converter type circuit use two power transistors as switches. Class-E converter type circuit use only one power transistor as a switch. For lower manufacturing cost, Class-E converter type is used more widely than half-bridge converter type. The push-pull converter type is not widely used since it requires complicated heating coil. However, the push-pull converter type circuit is better suited for applying power to the heating coils than the class-E converter type.

The heating bowls are made generally using double layers of metal. The inner layer is aluminum and the outer layer is iron. The outer layer of iron is to increase the resistance of the bowl. Without the outer iron layer, the resistance of the bowl may be too low and the class-E converter type circuit may not operate properly. However, the push-pull converter type circuit can operate with a bowl having a low resistance.

The push-pull converter type circuit requires a heating coil to have a center-tap to operate properly. The inductance of the two parts of the coil should be substantially the same for proper operation of the push-pull converter type circuit. For this purposes, the two parts of the coil, i.e., the first part running from the beginning of the coil to the center-tap and the second part from the center-tap to the ending of the coil, should be similar to each other in shape and geometry.

BRIEF SUMMARY OF THE INVENTION

The present invention relates to heating circuits for heating devices, e.g., rice cooker. According to embodiments of the present invention, the push-pull converter type circuit is used as a heating circuit by adapting new winding methods of the heating coil. The manufacturing cost of the cooker is reduced since the push-pull converter type circuit enables the use of a single layer bowl rather than a traditional double layer bowl.

In one embodiment, a heating circuit for heating a conductive bowl includes a voltage source; a first heating coil provided between first and second nodes and being configured to heat the conductive bowl; a second heating coil provided between the second node and a third node and being configured to heat the conductive bowl; first capacitor and first switch provided in parallel between the first node and a fourth node; and second capacitor and second switch provided in parallel between the third node and the fourth node. The first and second heating coils define a circle-like shape having a center. The first and second heating coils are configured to be aligned to each other if one of the first and second heating coils is moved with respect to a line extending through the center of the circle-like shape. The first and second coils have substantially the same shape and size to provide substantially the same inductance.

In one embodiment, the heating circuit further comprises an inductor coupled to the second node and the voltage source; a first diode provided anti-parallel to the first switch; and a second diode provided anti-parallel to the second switch. The first and second switches are IGBTs or BJTs. The conductive bowl and the first and second heating coils define a transformer, wherein the first and second heating coils are configured to heat the conductive bowl, the conductive bowl having a single layer of metal, the heating circuit is a push-pull type heating circuit. The single layer of metal is an aluminum layer.

In one embodiment, the first and second heating coils overlap at a plurality of points along a line that extends through the center of the circle-like shape. The first and second heating coils are configured to be aligned to each other if one of the first and second heating coils is rotated about the line by 180 degrees.

In another embodiment, the first and second heating coils do not overlap each at any point. The first and second heating coils are configured to be aligned to each other if one of the first and second heating coils is moved by a given distance along the line.

In another embodiment, a device for heating or cooking food includes a conductive bowl having a single layer of metal; a voltage source; a first heating coil provided between first and second nodes and being configured to heat the conductive bowl; a second heating coil provided between the second node and a third node and being configured to heat the conductive bowl; first capacitor and first switch provided in parallel between the first node and a fourth node; and second capacitor and second switch provided in parallel between the third node and the fourth node. The first and second heating coils define a circle-like shape having a center. The first and second heating coils are configured to be aligned to each other if one of the first and second heating coils is moved with respect to a line extending through the center of the circle-like shape.

In another embodiment, the device further includes an inductor coupled to the second node and the voltage source; a first diode provided anti-parallel to the first switch; and a second diode provided anti-parallel to the second switch. The device uses a push-pull type heating circuit to heat the conductive bowl. The conductive bowl and the first and second heating coils define a transformer, wherein the single layer of metal is an aluminum layer.

In another embodiment, the first and second heating coils overlap each other at a plurality of points along a line that extends through the center of the circle-like shape. The first and second heating coils are configured to be aligned to each other if one of the first and second heating coils is rotated about the line by 180 degrees.

In yet another embodiment, the first and second heating coils do not overlap each at any point. The first and second heating coils are configured to be aligned to each other if one of the first and second heating coils is moved by a given distance along the line.

DETAILED DESCRIPTION OF THE INVENTION

Figure 1:
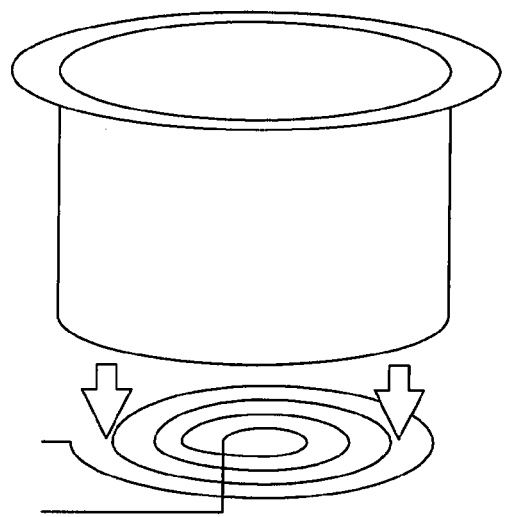
FIG. 1 shows an induction heating cooker that has a metal bowl and a heating coil that together define a transformer.

The present invention relates to an induction heating circuit for cooker, e.g., a rice cooker. The rice cooker has a housing enclosing a metal bowl, a heating coil, and a ceramic provided between the heating coil and the metal bowl. FIG. 1 shows an induction heating cooker that has a metal bowl and a heating coil that together define a transformer. The turns ratio is n:1, where n is the number of coil turns. A power circuit applies AC voltage across the coil. Then the AC voltage is transferred to the secondary side, which is the metal bowl. The AC voltage reduced to 1/n. Because the metal bowl has low resistance, high current flows. This current is seen to be reduced to 1/n at the primary side, which is on the side of the coil.

Figure 2:
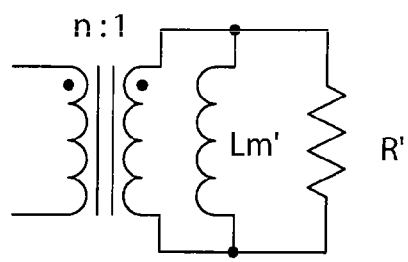
FIG. 2 illustrates a simple equivalent circuit of the heating coil and the metal bowl as an ideal transformer, a magnetizing inductance, and resistive load.

FIG. 2 illustrates a simple equivalent circuit of the heating coil and the metal bowl (or conductive bowl) as an ideal transformer, a magnetizing inductance, and resistive load. In the simple equivalent circuit, the magnetizing inductance $L_m'$ in secondary side is viewed as n*n times larger inductor. And, the load resistor R' is also viewed as n*n times larger resistor in primary side. That is, $L_m=n*n*L_m'$ and R=n*n*R', where $L_m$, R are magnetizing inductance and resistance at the primary side. As $L_m$ and R is enlarged by the same factor, the ratio $R/L_m$ remains the same as $R'/L_m'$.

There are several methods of applying AC voltage to the primary side of the transformer comprising the coil and the metal bowl. The circuits are generally comprised of switching semiconductor devices (or transistors), capacitor and inductors. The semiconductor devices are operated in switch mode, not in linear mode.

Figure 3:
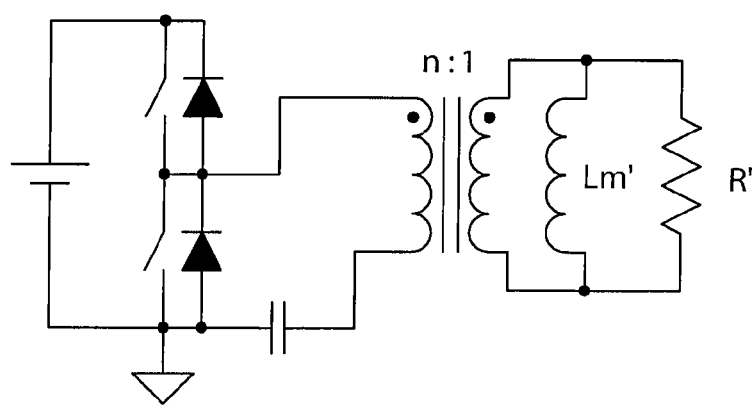
FIG. 3 illustrates a half-bridge type circuit that could be used as the heating circuit.

FIG. 3 illustrates a half-bridge type circuit. In this circuit, as the voltage applied on the switching devices does not exceed the dc link voltage by much, the switch devices having low breakdown voltage can be used. The output voltage is symmetrical upon voltage polarity. However, this type of circuit requires two switching devices and complicated driver for controlling the high side switching device. And, because the output voltage is small, the number of turns of coil required is small and the primary current needs to be large.

Figure 4:
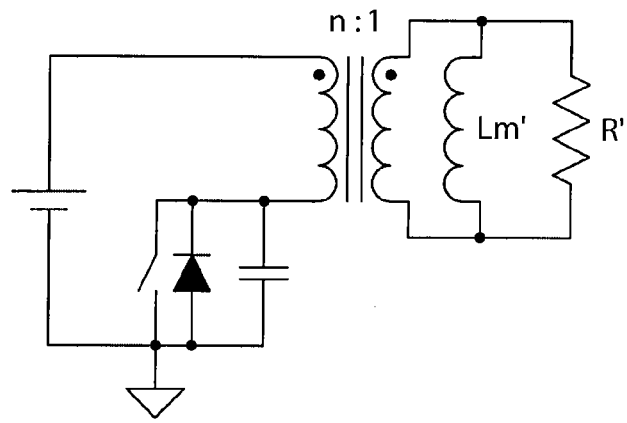
FIG. 4 illustrates a class-E converter type circuit as an induction heating circuit.

FIG. 4 illustrates a class-E converter type circuit. This circuit has only one switching device. The manufacturing cost is cheap. The output rms voltage is nearly fixed and larger than that of the half bridge type. However, the switching device would see much larger voltage than the dc link voltage and would require using a switching semiconductor device having high breakdown voltage.

Figure 5A:
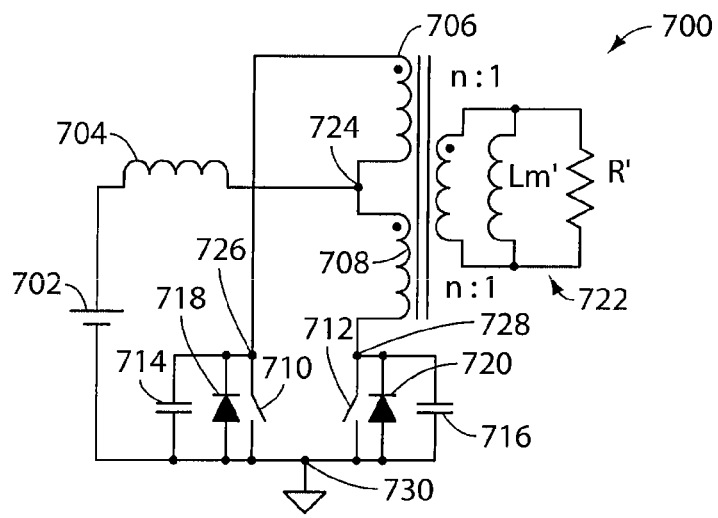
FIGS. 5A and 5B illustrate push-pull converter type circuits that may be used as induction heating circuits.

FIG. 5A illustrates a push-pull converter type circuit according to one embodiment of the present invention. The circuit 700 includes a voltage source 702, an inductor 704, a first heating coil 706, a second heating coil 708, a first switch 710, a second switch 712, a first capacitor 714, a second capacitor 716, a first diode 718, and a second diode 720. A metal bowl 722 is inductively coupled to the heating coils 706 and 708. The present embodiment is described in connection with an induction heating cooker, e.g., a rice cooker; however, the invention is not limited to such a device.

Figure 5B:
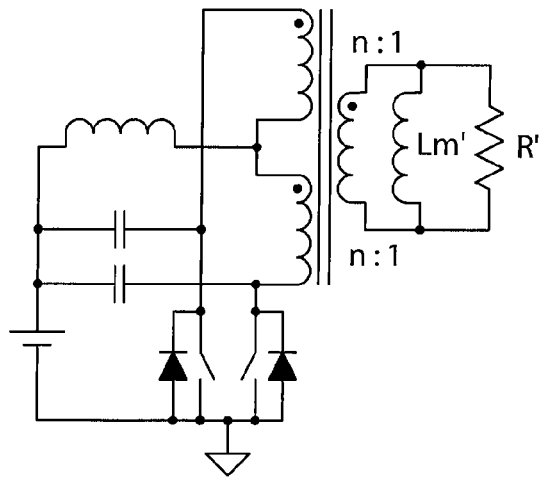

FIG. 5B illustrates a push-pull converter type circuit (or Royer circuit) according to another embodiment of the present invention. The first capacitor is provided between the first node and the voltage source. The second capacitor is provided between the third node and the voltage source. That is, the first and second capacitors are not provided in parallel to the first and second switches.

Referring back to FIG. 5A, the inductor 704 is provided between the voltage source 702 and a node 724. The node 724 is provided between the heating coils 706 and 708. The first heating coil 706 is provided between a node 726 and the node 724. The second heating coil 708 is provided between the node 724 and a node 728 and is in series with the first beating coil 706, i.e., a center tap exists. The first capacitor 714, the first diode 718, and the first switch 710 are provided between the node 726 and a node 730. The node 730 has a ground potential or is part of a negative rail. The second switch 712, the second diode 720, and the second capacitor 716 are provided between the node 728 and the node 730.

In the present embodiment, the switches 710 and 712 are an Insulated Gate Bipolar Transistor (IGBT) or Bipolar Junction Transistor (BJT). The diodes 718 and 720 are anti-parallel to the switches 710 and 712. The diodes may be independent devices or may be part of the switches, e.g., body diodes. The heating coils 706 and 708 are provided below the metal bowl 722, or they may be provided around the body of the metal bowl. In one implementation, the heating coils 706 and 708 are provided below the metal bowl and another heating coil is provided around the body of the metal bowl.

As shown, this circuit 700 has two switching devices having common point in ground. High side driving is not difficult. The switching semiconductor devices preferably should be of high breakdown voltage. The size of output voltage is similar to a class-E type circuit; however, its shape is different. Its shape resembles the ideal sine wave, while the output waveform of class-E has many high order harmonics. Therefore, the circuit 700 should not require the use of an expensive cable which is comprised of many thin wires Both of the class-E converter type circuit of FIG. 4 and the push-pull type circuit 700 of FIG. 5A are resonant circuits. Soft switching is possible due to the resonance. The switches are turned-off in zero-voltage. The capacitors connected in parallel to the switches do not allow the fast rising of the voltage across it. From the turn-off of the switch, resonance takes place. The voltage across the switch resembles the half sine wave. It jumps up and returns to zero. In this resonant period, the energy in inductor moves to capacitor and it returns to the inductor. After the capacitor voltage returns to zero, the inductor current flows through the diode connected in anti-parallel to the switch. While diode is on-state, the switch is gated-on. Then, the switch is turned-on in zero voltage and zero current state.

However, if the resonant energy is consumed too much by the load, the small remaining resonant energy cannot bring the switch to the zero voltage and zero current state. The switch would need to be turned-on with some voltage in the capacitor which is connected in parallel to the switch. Then, the capacitor needs to be discharged by the switch. This would result in large power loss. Therefore, both types of the circuits may be to be operated in soft switching condition. The load R' should not be too small compared to the magnetization inductance. The push-pull type circuit, however, may be operated in soft switching condition with the smaller value of $R'/Lm'$ than that of class-E converter type circuit.

The push-pull type circuit can operate properly with the bowl having low resistivity. Usually, the bowl has a double layer, an inner layer made of Aluminum and an outer layer made of Iron. The outer iron layer provides for an increased resistivity at the surface of the bowl. The class-E type circuit generally requires the use of a bowl having a double layer. However, the push-pull type circuit may use a bowl having a single layer since it may operate with a bowl having low voltage. In both circuit, the conduction loss will be between these two conduction loss equations. The following table compares the power losses.

| | P | Class-E type | Push Pull | Push Pull/Class-E |
|---|---|---|---|---|
| Switching Loss | $I_{peak}$ * Esw * f | 14.5 * Esw * f | 2 * 4.5 * Esw * f = 9.0 * Esw * f | 62% |
| Conduction Loss A (unipolar) | $I_{rms}^2$ * Ron | $5.4^2$ * Ron = 29.2 * Ron | $2 * 2.5^2$ * Ron = 12.5 * Ron | 43% |
| Conduction Loss B (bipolar) | $I_{avg}$ * Von | 3.1 * Von | 2 * 1.6 * Von = 3.2 * Von | 103% | resistivity. The present embodiment enables the use of a single layer bowl to reduce the manufacturing cost.

Figure 6:
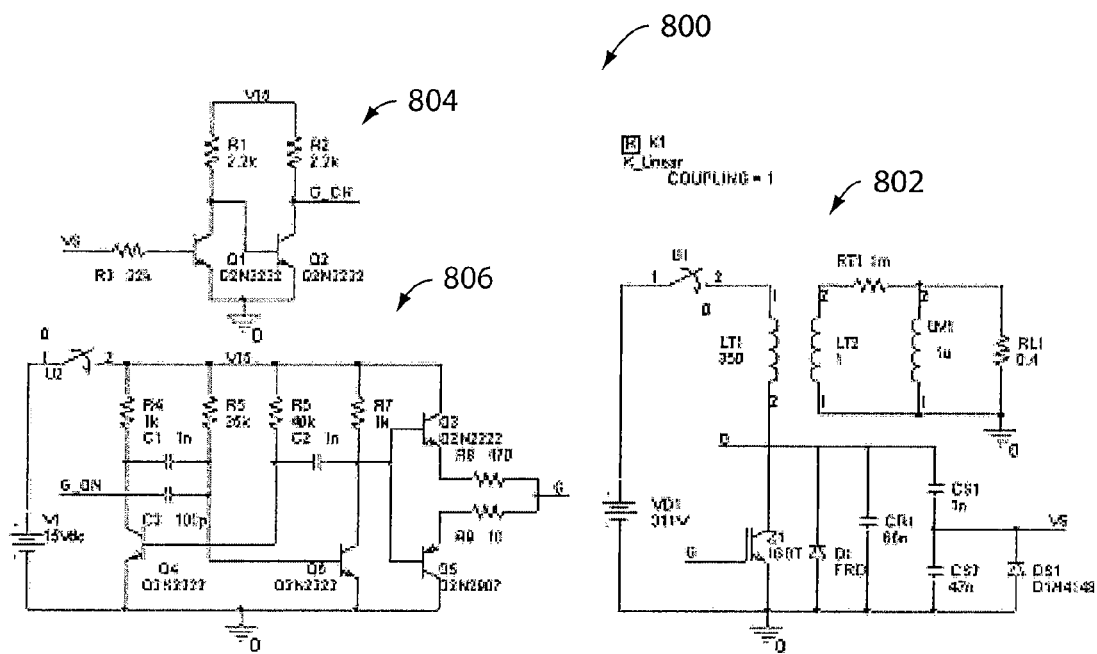
FIG. 6 illustrates an exemplary class-E converter type circuit.

FIG. 6 illustrates circuits associated with a conventional class-E type induction heating circuit 800. A circuit 802 is the power circuit connected to the heating coils. A circuit 804 is the sensor to sense the switch voltage. A circuit 806 is the gate driver to drive the switch in the circuit 802. When the switch voltage goes below a certain level, the switch is turned on. After a given time, the switch is turned off and the resonance begins.

Figure 7:
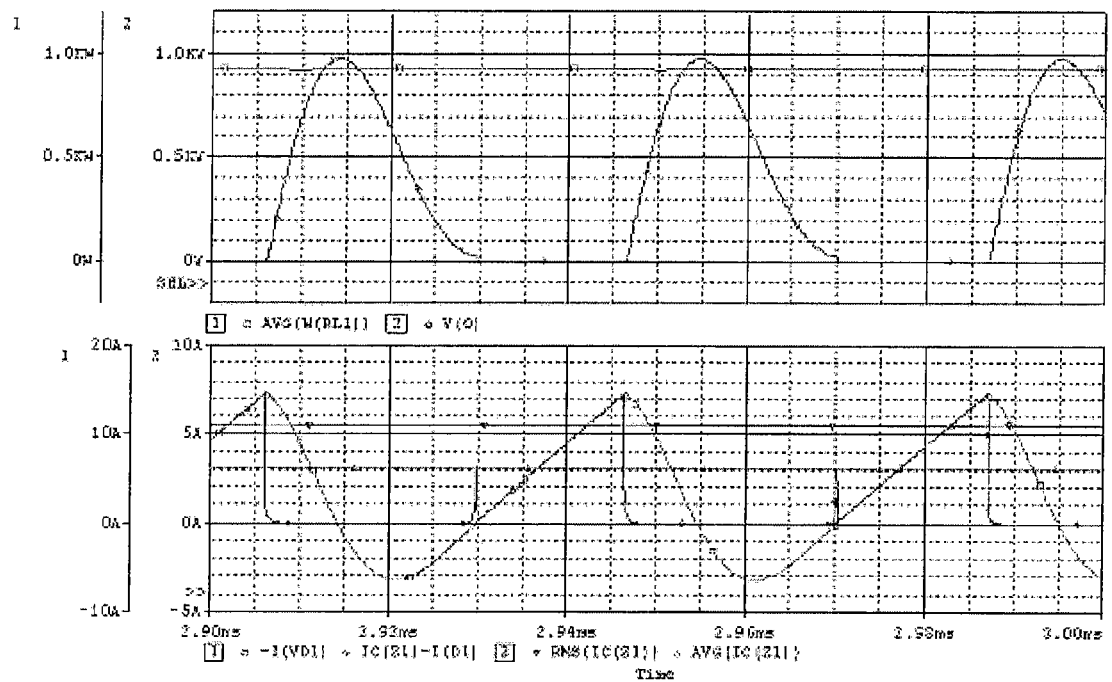
FIG. 7 illustrates simulated waveforms of the class-E converter circuit of FIG. 6.

FIG. 7 illustrates waveforms associated with the circuits in FIG. 6. The circuit is at the edge of soft switching. The switch voltage does not return to zero. The switch needs to discharge the capacitor whose voltage is slightly higher than zero. The ratio RL1/LM1=0.4/1 u=0.4 Mega ohm/Henry.

Figure 8:
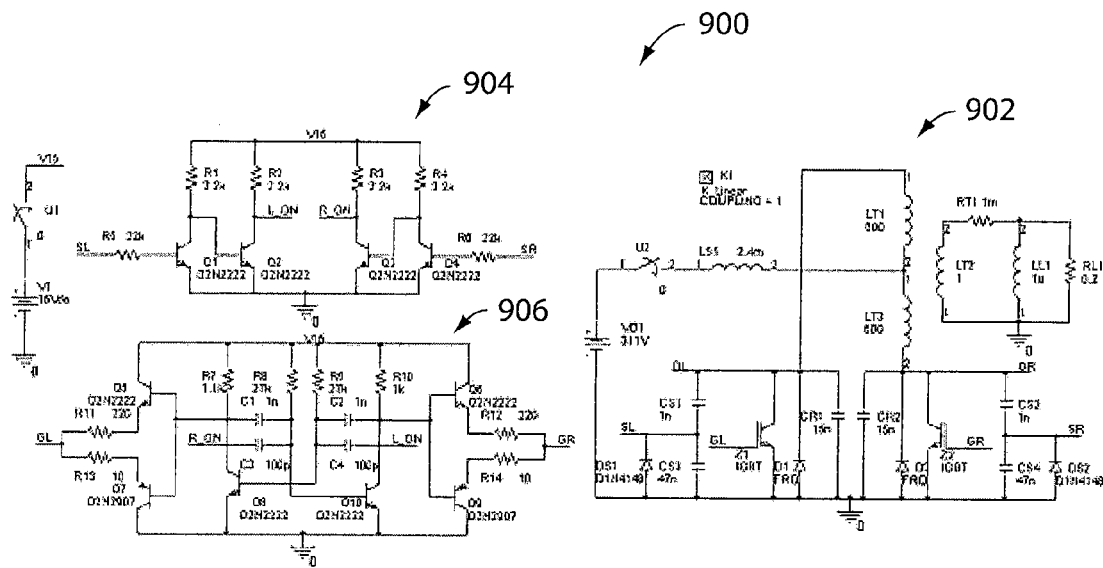
FIG. 8 illustrates an exemplary push-pull converter type circuit.

FIG. 8 illustrates circuits associated with a push pull type induction heating circuit 900. A circuit 902 is the power circuit connected to the heating coils. A circuit 904 is the sensor to sense the switch voltage. A circuit 906 is the gate driver to drive the switch in the circuit 902. When the voltage of one switch goes below a certain level, the circuit 906 turns the first switch of the circuit 902 and turns off the second switch of the circuit 902.

Figure 9:
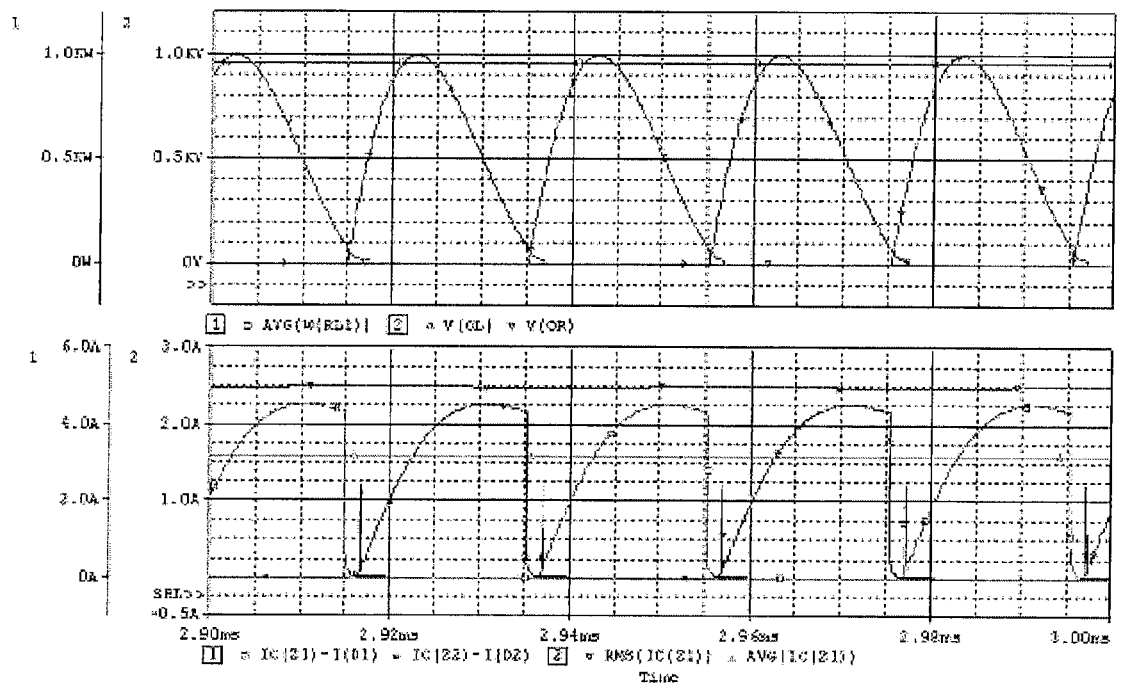
FIG. 9 illustrates simulated waveforms of the push-pull converter type circuit of FIG. 8.

FIG. 9 illustrates waveforms associated with the circuits in FIG. 8. The heating circuit 900 is at the edge of soft switching. The switch voltage does not return to zero. The switch needs to discharge the capacitor whose voltage is slightly higher than zero. The ratio RL1/LM1=0.2/1 u=0.2 Mega ohm/Henry. This is one half of that of the class-E type circuit.

The push-pull type circuit 900 can operate in soft switching mode at one half of the ratio RL/LM. For similar shaped bowl, the inductance would be similar. Therefore, the push-pull type circuit 900 can operate properly with the bowl that is made of low resistivity material.

Moreover, the power efficiency of the push pull circuit is better than that of class-E circuit.

| | Class-E type | Push Pull |
|---|---|---|
| Frequency | 25 kHz | 25 kHz |
| Output power | 920 W | 960 W |
| Peak voltage of switch | 980 V | 990 V |
| Peak current | 14.5 A | 4.5 A |
| RMS current | 5.4 A | 2.5 A |
| Average current | 3.1 A | 1.6 A |

The switching power loss is nearly proportional to the peak currents. The conduction loss for unipolar device is the product of (RMS current)$^2$ and on-resistance. The conduction loss for bipolar device is the product of average current and on-voltage. In both circuit, the conduction loss will be between these two conduction loss equations. The following table compares the power losses.

In the table above, Esw*f notes product of switching power loss per peak current and frequency. Ron denotes on-resistance. Von denotes on-voltage.

For the switching loss, the push pull circuit is much better than the usual class-E type circuit. The conduction loss of the push-pull circuit is 43%~103% of the class-E type circuit. The use of the push-pull circuit would result in much improvement in power efficiency. With the push-pull type circuit, the induction heating cookers can be made with smaller and cheaper IGBT and diode, and the heat sink size can be reduced.

Herein, two winding methods for induction heating coil are disclosed for illustrative purposes. As will be understood by those skilled in the art, additional winding methods may be used to provide a symmetrical center-tap transformer.

Figure 10:
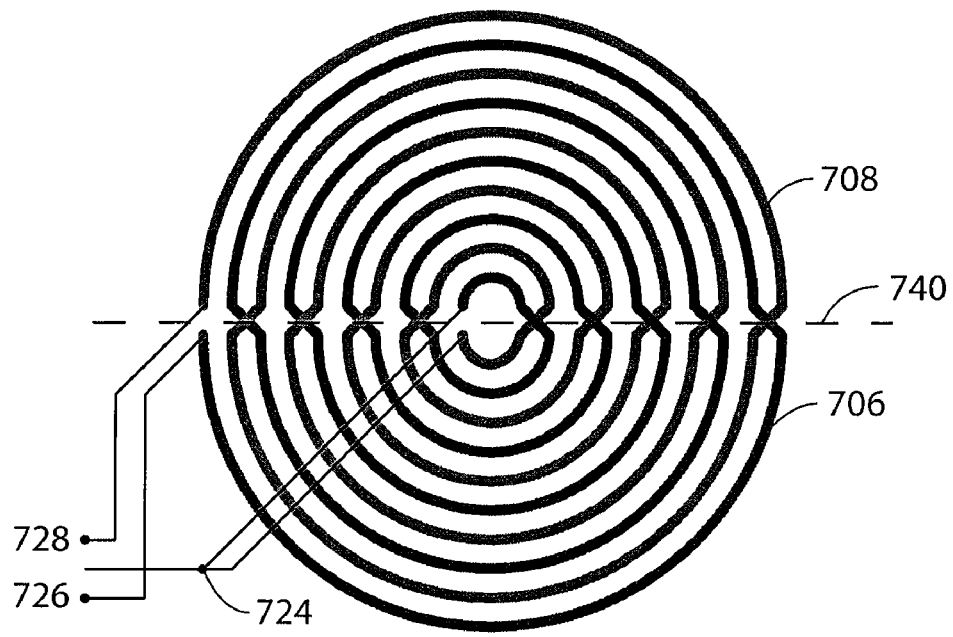
FIG. 10 illustrates a winding method for the first and second heating coils according to one embodiment of the present invention.

FIG. 10 illustrates a winding method for the first and second heating coils 706 and 708 according to one embodiment of the present invention. The winding method provides a symmetrical center-tap transformer. The first and second heating coils 706 and 708 define a circle (or circle-like shape). The heating coils overlap at a plurality of points along a line 740 that extends through the center of the circle. The node 724 is connected to the ends of the heating coils that are provided proximate to the center. The first and second heating coils 706 and 708 are tapped at the center to provide symmetry. The nodes 726 and 728 are connected to the ends of the heating coils that are provided distal to the center. The first and second heating coils 706 and 708 have substantially the same shape, size, and thickness. The heating coils are symmetrical to each other along the line 740. That is, if the first heating coil is rotated 180 degrees along the line 740, the first heating coil 706 is aligned to the second heating coil 708. Accordingly, the first ands second heating coils 706 and 708 have substantially the same inductance.

Figure 11:
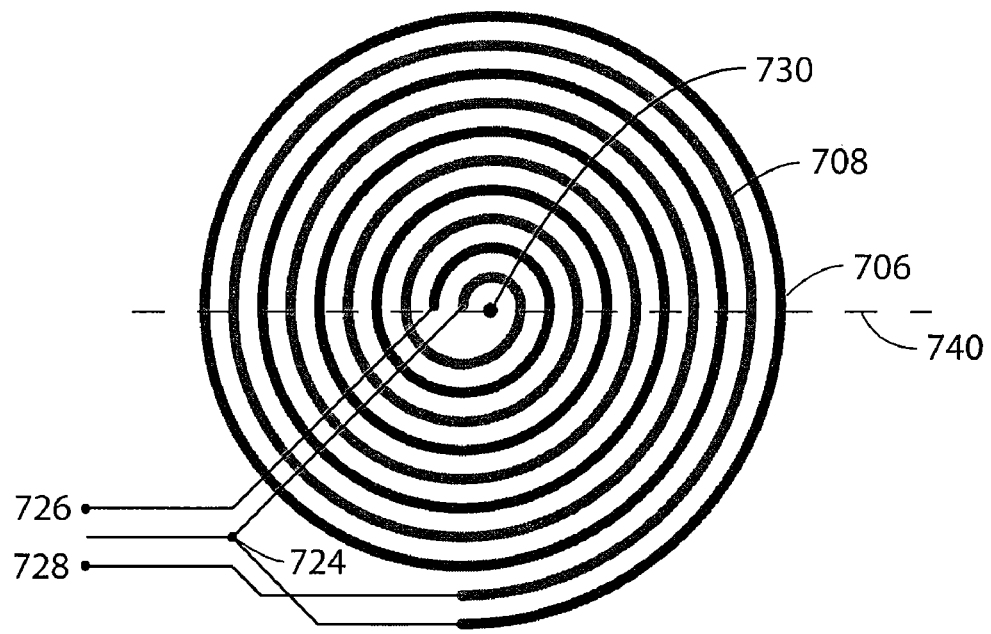
FIG. 11 illustrates a winding method for the first and second heating coils according to another embodiment of the present invention.

FIG. 11 illustrates a winding method for the first and second heating coils 706 and 708 according to another embodiment of the present invention. The winding method provides a symmetrical center-tap transformer. The first and second heating coils 706 and 708 are configured to have substantially the same inductance. The first and second heating coils 706 and 708 define a circle-like shape (or spiral). The heating coils are wrapped around the center without overlapping each other. The node 724 is connected to the ends of the heating coils that are provided proximate to the center. The nodes 726 and 728 are connected to the ends of the heating coils that are provided distal to the center. The first and second heating coils 706 and 708 have substantially the same shape, size, and thickness. The first and second heating coils are wrapped around a point 730. The point 730 may be the center of the circle-like shape (spiral) defined by the heating coils. The first heating coil 706 is separated by the second heating coil 708 by a distance X. The first and second heating coils 706 and 708 are configured to be aligned to each other if one of them is shifted by the distance X along the line 740.

The present invention has been described in terms of specific embodiments. As will be apparent to those skilled in the art, various changes and modifications may be made without departing from the spirit and scope of the invention. For example, the heating circuit has been described in the context of a cooker but is not limited to such a device. The scope of the invention should be interpreted using the appended claims.

What is claimed is:

1. A heating circuit for heating a conductive bowl, the circuit comprising:
   a voltage source;
   a first heating coil provided between first and second nodes and being configured to heat the conductive bowl;
   a second heating coil provided between the second node and a third node and being configured to heat the conductive bowl;
   first capacitor and first switch provided in parallel between the first node and a fourth node; and
   second capacitor and second switch provided in parallel between the third node and the fourth node,
   wherein the first and second heating coils define a circle-like shape having a center, and
   wherein the first and second heating coils are overlapping each other at a plurality of points, the points defining a line extending through the center of the circle-like shape.

2. The heating circuit of claim 1, wherein the first and second coils have substantially the same shape and size to provide substantially the same inductance.

3. The heating circuit of claim 1, further comprising:
   an inductor coupled to the second node and the voltage source;
   a first diode provided anti-parallel to the first switch; and
   a second diode provided anti-parallel to the second switch.

4. The heating circuit of claim 3, wherein the first and second switches are IGBTs or BJTs.

5. The heating circuit of claim 1, wherein the conductive bowl and the first and second heating coils define a transformer, wherein the first and second heating coils are configured to heat the conductive bowl, the conductive bowl having a single layer of metal, the heating circuit is a push-pull type heating circuit.

6. The heating circuit of claim 5, wherein the single layer of metal is an aluminum layer.

7. A device for heating or cooking food, the device comprising:
   a conductive bowl having a single layer of metal;
   a voltage source;
   a first heating coil provided between first and second nodes and being configured to heat the conductive bowl;
   a second heating coil provided between the second node and a third node and being configured to heat the conductive bowl;
   first capacitor and first switch provided in parallel between the first node and a fourth node; and
   second capacitor and second switch provided in parallel between the third node and the fourth node,
   wherein the first and second heating coils define a circle-like shape having a center, and
   wherein the first and second heating coils are configured to overlap each other at a plurality of points, the points defining a line extending through the center of the circle-like shape.

8. The device of claim 7, further comprising:
   an inductor coupled to the second node and the voltage source;
   a first diode provided anti-parallel to the first switch; and
   a second diode provided anti-parallel to the second switch,
   wherein the device uses a push-pull type heating circuit to heat the conductive bowl.

9. The device of claim 7, wherein the conductive bowl and the first and second heating coils define a transformer, wherein the single layer of metal is an aluminum layer.

10. The heating circuit of claim 7, wherein the first and second heating coils rotated about the line by 180 degrees from each other.

* * * * *